June 27, 1950 — C. L. EVANS — 2,512,740
ELECTRICAL CATTLE GUARD
Filed Nov. 6, 1945 — 2 Sheets-Sheet 1

INVENTOR
CARROLL L. EVANS
BY
Munn, Liddy & Glaccum
ATTORNEYS

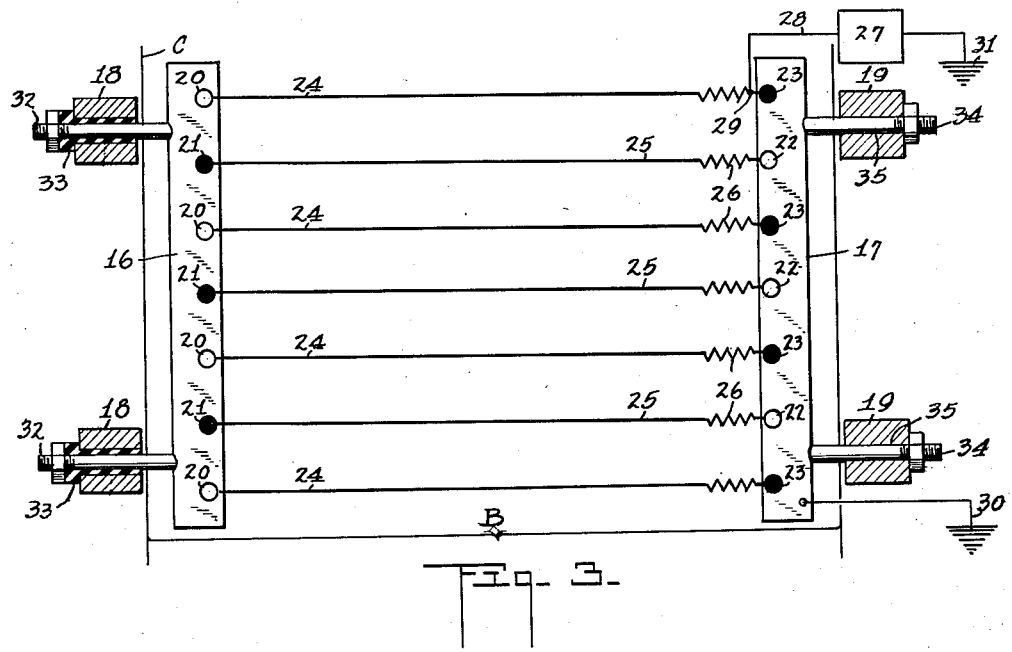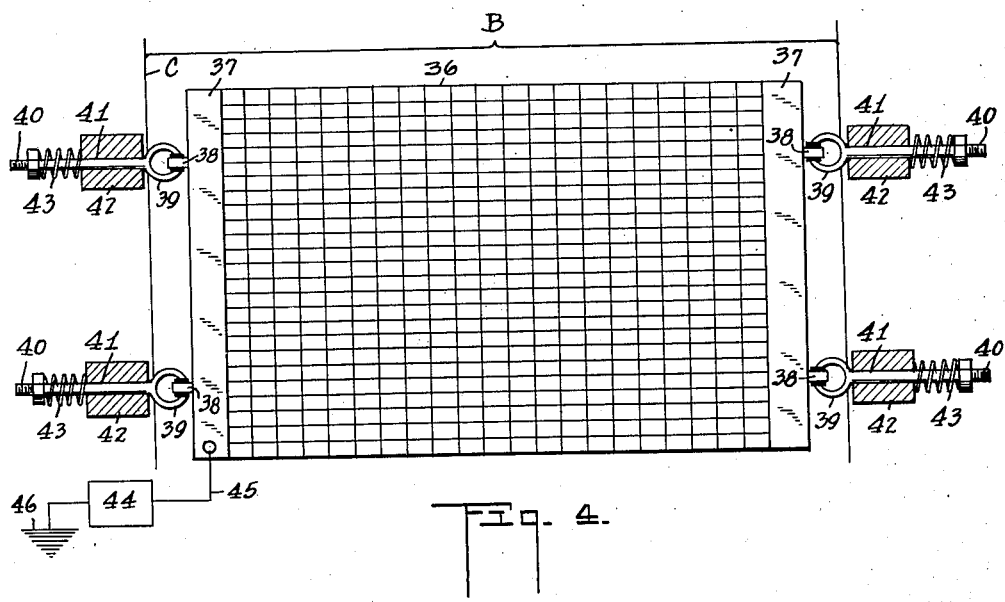

Patented June 27, 1950

2,512,740

UNITED STATES PATENT OFFICE 2,512,740

ELECTRICAL CATTLE GUARD

Carroll L. Evans, Tipton, Calif.

Application November 6, 1945, Serial No. 626,937

6 Claims. (Cl. 256—10)

The present invention relates to improvements in electrical cattle guards, and it consists of the combinations, constructions and arrangements hereinafter described and claimed.

An object of my invention is to provide an electrical cattle guard, which is designed for bridging a gap that is formed in a fence at a location where a roadway crosses the fence line. The electric shock administered will suffice to keep cattle from passing through the gap.

A further object resides in the provision of an electrical cattle guard that is constructed in such a manner as to allow the free passage of vehicles through the fence gap.

Other objects and advantages will appear as the specification proceeds, and the novel features will be particularly pointed out in the appended claims.

For a better understanding of my invention, reference should be had to the accompanying drawing, forming part of this application, in which:

Figure 3 is a plan view of a modified form of my cattle guard, the anchor posts being illustrated in section; and Figure 4 is a plan view of a still further modification of my cattle guard.

Figure 1:
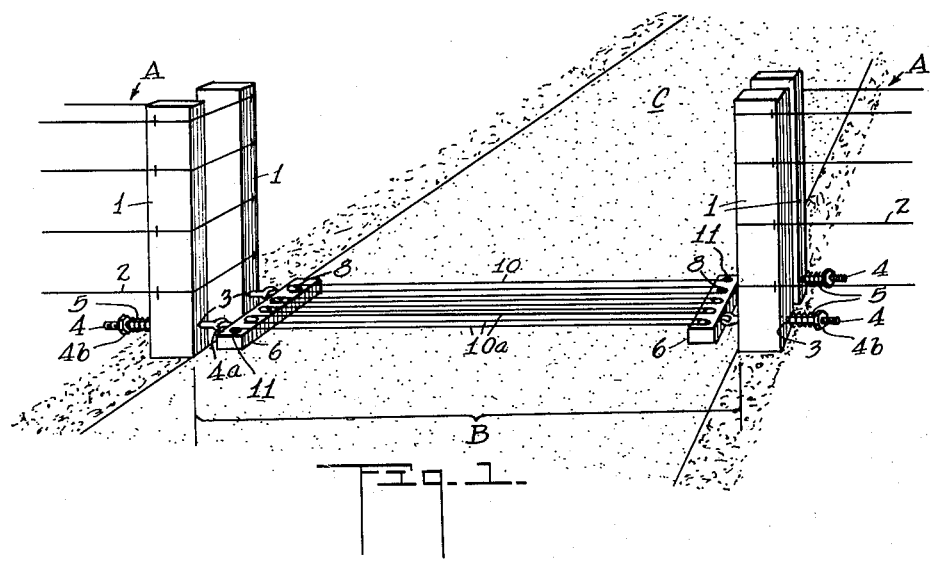
Figure 1 is a perspective view illustrating one form of my electrical cattle guard arranged in a fence gap.

While I have shown only the preferred forms of my invention, it should be understood that various changes, or modifications, may be made within the scope of the appended claims without departing from the spirit thereof.

Referring now to the drawings in detail, it will be noted that I have shown a fence A provided with a gap B therein at a point where the fence line crosses a roadway C. The fence includes upright posts 1 that are well anchored in the earth and having wires 2 secured thereto.

Figure 2:
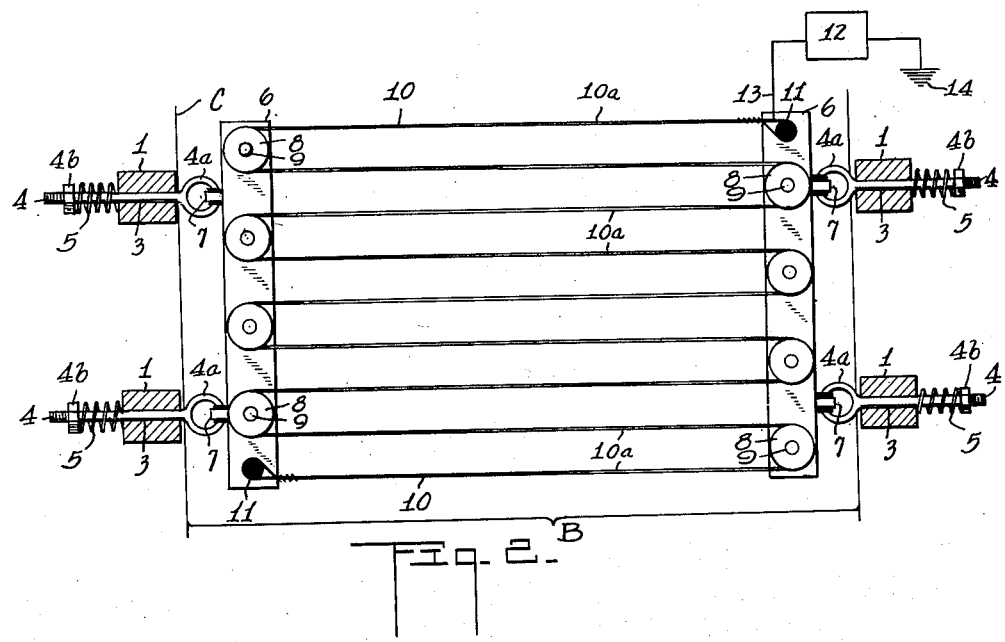
Figure 2 is a plan view of the cattle guard disclosed in Figure 1, parts being shown in section.

The posts 1 are preferably arranged in pairs along opposite sides of the roadway, and are provided with openings 3, which are made for receiving draw bolts 4 as shown in Figures 1 and 2. These draw bolts have ring-shaped ends 4a disposed on the roadside of the posts and adjustable nuts 4b threaded on the outer ends of the bolts. Coil springs 5 are confined between the nuts 4b and the posts 1, thus permitting the ringed ends 4a of the draw bolts to move relative to the posts.

It will be noted that I have provided headers 6, which extend lengthwise of the roadway along opposite sides of the latter. These headers are fashioned from non-conducting material and are hinged or swingably connected to the ringed ends 4a of the draw bolts by insulated eyes 7.

The headers 6 are disposed close to the surface of the roadway and have a plurality of pulleys 8 rotatably mounted thereon by axles 9. A conductor wire 10 is trained back and forth across the roadway and passes around the pulleys, the ends of the wire being secured to insulator posts 11. A suitable source of electricity, such as a charger 12, has one side thereof connected by a conductor 13 to the wire 10, while its other side is grounded at 14.

From the foregoing description of the various parts of my electrical cattle guard, as illustrated in Figures 1 and 2, the operation thereof may be readily understood. The conductor wire 10 is normally charged with electricity from the source 12. Any animal attempting to pass through the fence gap B will contact with the conductor wire 10 and will complete a circuit from this wire to the ground, the latter acting as a conductor back to the charger 12. The electrical shock thus produced will cause the animal to back away from the guard.

When a vehicle moving along the roadway C arrives at the cattle guard, the sections 10a of the conductor wire 10 are successively depressed by the wheels of the vehicle. The springs 5 will yield sufficiently to permit the wire sections 10a to be depressed and then will restore the headers to their normal positions after the vehicle has cleared the cattle guard. The springs 5 maintain sufficient tension on the headers at all times to hold the pulleys 8 in engagement with the conductor wire passing therearound.

Figure 3 discloses an embodiment of my cattle guard in which a two wire system is employed, one normally being charged with electricity and the other made to serve as a ground. Headers 16 and 17 are disposed along opposite sides of the roadway C so as to extend lengthwise thereof. The headers 16 and 17 are made of conducting material, and are supported from pairs of upright posts 18 and 19, respectively, by means hereinafter described so as to be slightly spaced from the surface of the roadway.

It will be noted from Figure 3 that the header 16 is provided with conductor posts 20 and insulated posts 21, while the header 17 has conductor posts 22 and insulated posts 23 secured thereto. "Hot" wires 24 extend transversely across the roadway C and are secured to the posts 20 and 23. In a similar manner, "grounded" wires 25 are anchored to the posts 21 and 22. All of these wires are formed with extension springs 26 arranged therein in order to allow the wires to be depressed as a vehicle passes thereover.

The "hot" wires 24 are charged with electricity by a charger 27, or other suitable source, that is connected by a wire 28 to one of the wires 24, as at 29. All of the wires 24 are electrically connected together through the header 16 and the conductor posts 20. The "ground" wires 25 are insulated from the header 16 by the posts 21 but are electrically connected by the conductors 22 to the header 17. The latter is grounded at 30. The charger 27 has one side thereof grounded at 31.

The header 16 is adjustably supported from the posts 18 by means of draw bolts 32, the latter being insulated from the posts by non-conductor sleeves 33. In Figure 3 I show draw bolts 34 extending from the header 17 and passing through openings 35 formed in the upright posts 19.

The operation of my electrical cattle guard, as illustrated in Figure 3, may be briefly set forth as follows: The wires 24 are charged electrically from the source 27 and the wires 25 are grounded at 30. When an animal steps on one of the wires 24, a closed electrical circuit is established from the charger 27, wires 28 and 24, through the animal and back to the ground 31 of the charger. In the event that the animal contacts wires 24 and 25, the circuit thus closed will extend from the charger 27, through wires 28 and 24, passing through the animal to the wire 25, header 17, grounds 30 and 31 and back to the charger.

The form of my cattle guard disclosed in Figure 4 is a modification of the embodiment shown in Figures 1 and 2. In this modified form, I make use of a metallic net 36, which has been substituted for the conductor 10 illustrated in Figures 1 and 2. This net is anchored to metallic headers 37, the latter having insulated eyes 38 that are swingably secured to ringed-ends 39 of draw bolts 40. The latter pass through openings 41 formed in the upright posts 42. Springs 43 encircle the draw bolts and yieldingly urge the ringed-ends 39 toward the posts, thus holding the metallic net 36 taut, but allowing the latter to be depressed as a vehicle passes thereover.

A charger 44, or other suitable source of electricity, has one side thereof connected to the metallic net 36 by a wire 45 and a header 37. The other side of the charger is grounded at 46. When an animal steps on the net 36, an electrical circuit will be closed, leading from the charger 44, through the wire 45, header 37, metallic net 36, passing through the animal to the ground 46 and back to the charger.

I claim:

1. In an electrical cattle guard for a fence gap, headers disposed on opposite sides of a roadway passing through the gap, the headers being mounted slightly above the surface of the roadway, a conductor extending across the roadway above the latter and being anchored to the headers, the conductor being depressible to the roadway by a vehicle passing thereover, and means for electrically charging the conductor.

2. In an electrical cattle guard for a fence gap, headers disposed on opposite sides of a roadway passing through the gap, the headers being mounted slightly above the level of the roadway, a conductor extending across the roadway above the latter and being anchored to the headers, yielding means supporting the conductor so that the latter is normally held out of contact with the roadway but may be depressed thereto by a vehicle passing over the conductor, and means for electrically charging the conductor.

3. In an electrical cattle guard for a fence gap, a pair of upright posts anchored at each side of a roadway, headers extending lengthwise of the roadway and being disposed on the roadside of the posts, conductors extending across the roadway and carried by the headers, means yieldingly supporting the headers from the posts and normally holding the conductors above the roadway but yielding in response to a vehicle passing over the conductors to allow the latter to be depressed to the roadway, and means for electrically charging the conductors.

4. In an electrical cattle guard for a fence gap, upright posts anchored at opposite sides of a roadway, headers extending lengthwise of the roadway and being disposed on the roadside of the posts, a series of pulleys carried by each header, a conductor trained back and forth across the roadway and passing around the pulleys to be supported by the latter, means yieldingly supporting the headers from the posts and normally holding the conductor above the roadway but yielding in response to a vehicle passing over the conductor to allow the latter to be depressed to the roadway, and means for electrically charging the conductor.

5. In an electrical cattle guard for a fence gap, upright posts anchored at opposite sides of a roadway, headers extending lengthwise of the roadway and being disposed on the roadside of the posts, an electrically-charged conductor and a grounded conductor extending across the roadway in spaced relation with each other and normally disposed above the roadway, the conductors being carried by the headers, means for supporting the headers from the posts, and extension springs arranged in each conductor to allow the latter to be depressed to the roadway.

6. In an electrical cattle guard for a fence gap, upright posts anchored at opposite sides of a roadway, an electrically-conducting net stretched across the roadway and normally being spaced above the latter, means for yieldingly supporting the ends of the net from the posts but yielding in response to a vehicle passing over the net to allow the latter to be depressed to the roadway, and means for electrically charging the net.

CARROLL L. EVANS.

REFERENCES CITED

The following references are of record in the file of this patent:

UNITED STATES PATENTS

| Number | Name | Date |
|---|---|---|
| 349,377 | White | Sept. 21, 1886 |
| 437,742 | Whittemore | Oct. 7, 1890 |
| 520,510 | Wilson | May 29, 1894 |
| 730,794 | Perkins | June 9, 1903 |
| 830,921 | Orr | Sept. 11, 1906 |
| 867,759 | Saunders | Oct. 8, 1907 |
| 1,580,185 | West | Apr. 13, 1926 |
| 1,704,085 | Holmgreen | Mar. 5, 1929 |
| 1,740,107 | Lewis | Dec. 17, 1929 |
| 2,023,835 | Heiken | Dec. 10, 1935 |